(12) United States Patent
Dubois et al.

(10) Patent No.: US 11,067,496 B2
(45) Date of Patent: Jul. 20, 2021

(54) SYSTEM FOR DETECTING A MECHANICAL FAULT IN A ROTATING SHAFT

(71) Applicant: Goodrich Actuation Systems Limited, Solihull (GB)

(72) Inventors: Fabien Dubois, Aylesbury (GB); Laura Albiol-Tendillo, Taragona (ES); Daniel Diaz-Lopez, Madrid (ES)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 31 days.

(21) Appl. No.: 16/137,778

(22) Filed: Sep. 21, 2018

(65) Prior Publication Data

US 2019/0162651 A1 May 30, 2019

(30) Foreign Application Priority Data

Nov. 27, 2017 (EP) .................................... 17275188

(51) Int. Cl.
| G01N 19/08 | (2006.01) |
| G01H 1/00 | (2006.01) |
| G01M 13/028 | (2019.01) |
| G01L 3/00 | (2006.01) |
| G01M 17/00 | (2006.01) |
| G01P 15/08 | (2006.01) |
| F16H 57/01 | (2012.01) |

(52) U.S. Cl.
CPC ............. G01N 19/08 (2013.01); G01H 1/003 (2013.01); G01L 3/00 (2013.01); G01M 13/028 (2013.01); G01M 17/00 (2013.01); G01P 15/0888 (2013.01); F16H 57/01 (2013.01)

(58) Field of Classification Search
CPC .... G01M 13/028; G01M 17/00; G01H 1/003; G01N 19/08; G01L 3/00; G01P 15/0888; F16H 57/01
USPC ....................................................... 73/862.192
See application file for complete search history.

(56) References Cited

U.S. PATENT DOCUMENTS 4,751,657 A 6/1988 Imam et al.
6,116,089 A * 9/2000 El-Ibiary ................ G01H 1/003
73/593

(Continued)

FOREIGN PATENT DOCUMENTS

DE 2327015 B1 5/1974
EP 2597437 A1 5/2013

(Continued)

OTHER PUBLICATIONS

Extended European Search Report for International Application No. 17275188.5 dated May 9, 2018, 13 pages.

(Continued)

*Primary Examiner* — Octavia Hollington
(74) *Attorney, Agent, or Firm* — Cantor Colburn LLP

(57) ABSTRACT

A new system is described that is able to detect mechanical failures in a rotating shaft or shafts such as those which may be found in an aircraft or other mechanical device or vehicle. The system comprises a first accelerometer provided on the rotating shaft to be monitored and a reference accelerometer provided elsewhere. The system can compensate information received from these accelerometers so as to determine a fault in the rotating shaft that is being monitored.

15 Claims, 1 Drawing Sheet

(56) References Cited

U.S. PATENT DOCUMENTS

| | | | |
|---|---|---|---|
| 6,289,735 B1* | 9/2001 | Dister | G01H 1/003 73/579 |
| 6,560,552 B2* | 5/2003 | Shen | G01H 1/003 702/183 |
| 6,622,972 B2 | 9/2003 | Urnes, Sr. et al. | |
| 6,950,763 B1* | 9/2005 | Bechhoefer | G01M 1/24 702/119 |
| 7,007,897 B2 | 3/2006 | Wingett et al. | |
| 7,322,794 B2* | 1/2008 | LeMieux | G05B 23/0283 416/40 |
| 8,457,836 B2 | 6/2013 | Balasu et al. | |
| 8,665,104 B2* | 3/2014 | Heda | G01H 1/006 340/683 |
| 8,810,173 B2* | 8/2014 | Li | H02P 29/0241 318/400.12 |
| 9,205,560 B1 | 12/2015 | Edsinger et al. | |
| 9,248,918 B2 | 2/2016 | Spiller | |
| 9,347,535 B1 | 5/2016 | Sheahan, Jr. et al. | |
| 9,437,056 B2 | 9/2016 | Huynh et al. | |
| 9,452,532 B2 | 9/2016 | Komatsu et al. | |
| 9,687,854 B2 | 6/2017 | Tsai et al. | |
| 10,063,124 B2* | 8/2018 | Donolo | H02K 11/35 |
| 2010/0215493 A1 | 8/2010 | Abdallah et al. | |
| 2013/0042682 A1* | 2/2013 | Busch | G01H 1/003 73/504.12 |
| 2014/0324365 A1* | 10/2014 | Orman | G01H 1/003 702/39 |
| 2015/0032389 A1* | 1/2015 | Hedin | G01M 13/045 702/34 |
| 2015/0288257 A1* | 10/2015 | Cooper | H02P 21/14 318/460 |
| 2015/0300802 A1* | 10/2015 | Linde | G01B 7/31 73/494 |
| 2017/0052060 A1* | 2/2017 | Garc A Prada | G05B 23/024 |

FOREIGN PATENT DOCUMENTS

| | | |
|---|---|---|
| EP | 3196626 A1 | 7/2017 |
| WO | 2014091956 A1 | 6/2014 |

OTHER PUBLICATIONS

Maged Elsaid Elnady, "On-Shaft Vibration Measurement Using a MEMS Accelerometer for Faults Diagnosis in Rotating Machines", School of Mechanical, Aerospace and Civil Engineering, The University of Manchester, 2013, 218 pages.

* cited by examiner

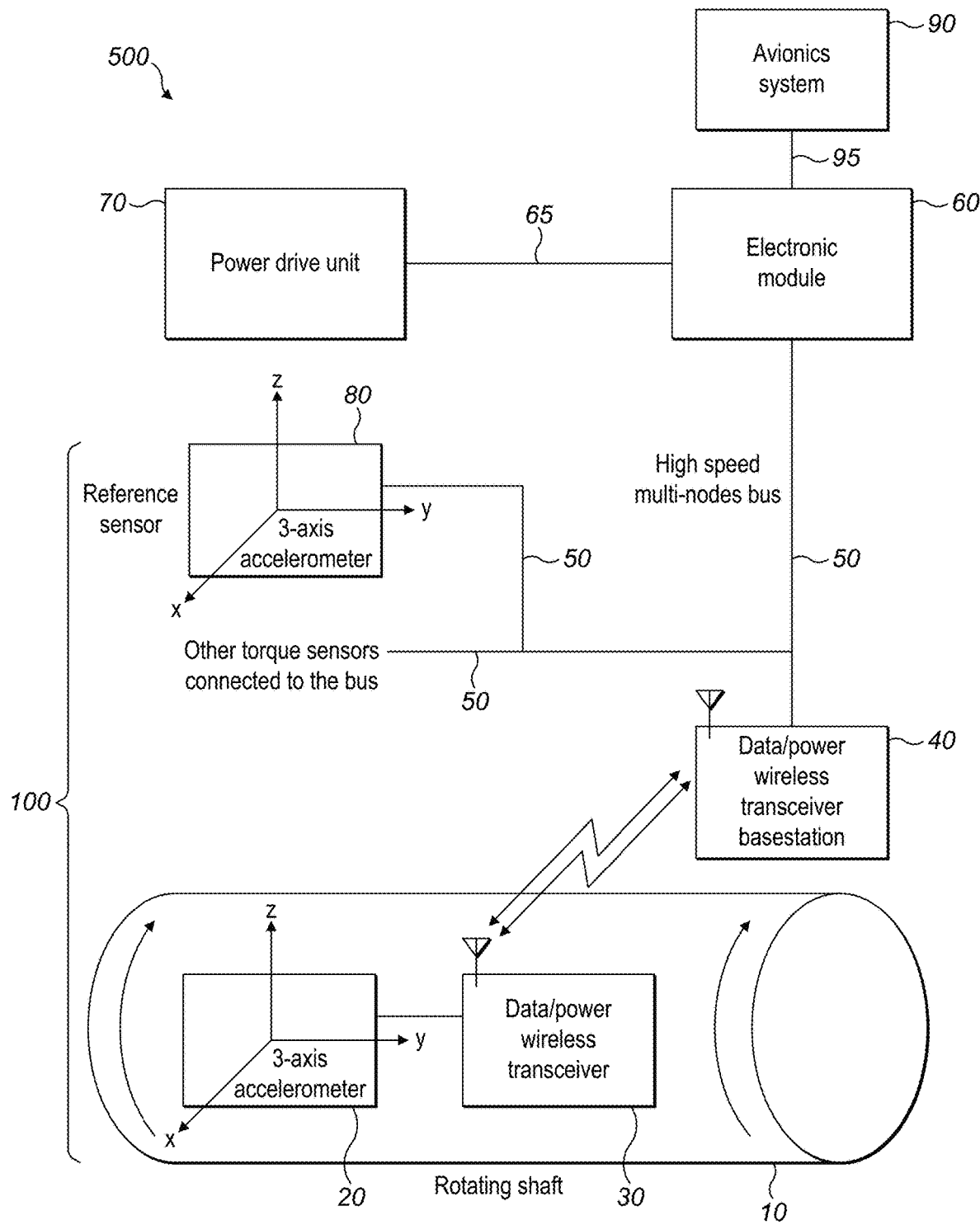

SYSTEM FOR DETECTING A MECHANICAL FAULT IN A ROTATING SHAFT

FOREIGN PRIORITY

This application claims priority to European Patent Application No. 17275188.5 filed Nov. 27, 2017, the entire contents of which is incorporated herein by reference.

TECHNICAL FIELD

The examples described herein relate to systems and methods for detecting mechanical failures, particularly in systems found in aircraft or other vehicles. The systems are used for detecting a mechanical fault in a rotating shaft.

BACKGROUND

Aircrafts generally contain mechanical protection devices (such as torque limiters in flap/slat assemblies) that may undergo mechanical failure at some point. In the case of a torque limiter that may be used for high lift systems; the torque limiter is designed to still be active in a worst case condition. This leads to the need for an overdesign of the wings to sustain the overload. An aim for many aircrafts, therefore, is to reduce the size, weight and cost of such mechanical protection devices.

Some known methods detect a jamming condition and limit the load to the airframe structure without torque limiters. Such methods are based on identifying different dynamics on actuators (i.e. position, speed and voltage), with the same input with similar environmental conditions; however, the fault detection bandwidth is limited by speed sensing.

Other methods are motivated by jamming detection and mitigation of jamming events. For example, a known method of locating the jamming event in a primary flight control system (either aft or forward jam) may be by comparing the reading of different force sensors and the commanded inputs.

Jamming detection has also been achieved by monitoring the current control command (i.e. output of the speed loop) for the actuator of a flap system, as the saturation of this command in certain conditions indicates a jamming event.

A new system is required, however, that has a reduced size, weight and cost in comparison to such known systems, that is able to detect any rapid change of mechanical behaviour, like jamming, and that improves the overall ease and accuracy in which fault conditions are detected.

SUMMARY

A system is described herein for detecting a mechanical fault of a rotating shaft of a component; said system comprising: a first accelerometer configured to be connected to said rotating shaft of said component for obtaining information relating to movement of said rotating shaft; and a second, reference accelerometer configured to be connected to said component at a location that is not on said rotating shaft for obtaining information relating to said location that is not on the rotating shaft; and means for comparing said first information with said second information to detect said fault in said rotating shaft.

The system may further comprise: a base station and/or an electronic module; means for transmitting first information from said first accelerometer to said base station and/or electronics module; said first information relating to the movement of said rotating shaft; means for transmitting second, reference, information from said second, reference accelerometer to said base station and/or electronics module, said second, reference, information relating to said location that is not on said rotating shaft.

A system is also described herein for detecting a mechanical fault of a rotating shaft of a component. The system comprises: a first accelerometer configured to be connected to said rotating shaft of said component; and a second, reference accelerometer configured to be connected to said component at a location that is not on said rotating shaft; a base station; means for transmitting first information from said first accelerometer to said base station; said first information relating to the movement of said rotating shaft; means for transmitting second, reference, information from said second, reference accelerometer to said base station; said second, reference, information relating to said location that is not on said rotating shaft; and said means for comparing said first information with said second information, to detect said fault in said rotating shaft.

In some examples, the means for comparing the first information with the second information to detect the fault may be provided in the base station. The examples are not limited to this, however, and this means for comparing may occur elsewhere, for example, in the electronics module, or elsewhere.

In some examples, the base station is configured to, alternatively, or additionally, transmit, receive and process the signals received from the accelerometers.

In some examples, the system may further comprise: an electronic module connected to the base station.

In some examples, the electronic module may be connected to the base station via a high-speed multi-nodes bus.

In some examples, the system may further comprise a power drive unit connected to the electronics module to provide power to the electronics module.

In some examples, the power drive unit may be connected to the electronics module via an electronic cable.

In some examples, the system may further comprise an avionics system and the electronics module may be connected to the avionics system.

In some examples, the means for transmitting the first information from the first accelerometer to the base station may comprise a wireless transceiver. This wireless transceiver may also be configured to be connected to the rotating shaft.

In some examples, the base station may comprise a wireless transceiver. The wireless transceiver may further be in bi-directional communication with the first means for transmitting the first information. In some examples, the sensor may also be wirelessly powered by the base station.

In some examples, the means for transmitting the second, reference, information from the second, reference accelerometer to the base station may comprise a high-speed multi-nodes bus.

In some examples, the first accelerometer sensor and/or the second, reference accelerometer sensor may comprise a 3 axis accelerometer sensor.

In some examples, the system may further comprise a plurality of the first accelerometer sensors. Each of the plurality of first accelerometer sensors may be configured to be connected to the rotating shaft.

In some examples, the plurality of first accelerometers may be configured to be connected to the same rotating shaft.

Additionally, or alternatively, in some examples, the plurality of first accelerometers may be configured to be connected to different rotating shafts.

In some examples, the first accelerometers may be provided in a plurality of locations along the length of the same rotating shaft.

In some of the examples, the first accelerometer (s) may be configured to sense the angular acceleration of the rotating shaft, or shafts at the shaft level.

In any of the examples described herein, the component may comprise an aircraft wing comprising a flap/slat system. The location of the second, reference component may be on the aircraft wing itself and the rotating shaft may comprise a power transmitting shaft of the flap/slat system.

In some of the examples, the component may comprise a gear box and the rotating shaft may form part of the gear box.

In some of the examples, the rotating shaft or shafts may be a power transmitting shaft or shafts.

An aircraft wing is also described that may comprise a flap/slat assembly and the system described above may be used to detect faults in the rotating shaft or shafts of the flap/slat assembly. In this case, the system may comprise: a first accelerometer that is connected to a rotating shaft of the flap/slat assembly; and a second, reference accelerometer connected to a different part of the component such as the aircraft wing itself. That is, at a location that is not on the rotating shaft that is being monitored. In some examples, more than one first accelerometer may be used and these may be positioned on the same rotating shaft, or on different rotating shafts. As described above, the system further comprises a base station and means for transmitting first information from the first accelerometer to the base station; the first information relating to the movement of the rotating shaft; means for transmitting second, reference, information from the second, reference accelerometer to the base station; the second, reference, information relating to the location that is not on the rotating shaft; and the base station being configured to compare the first information with the second information, to detect the fault in the rotating shaft.

A method for detecting a mechanical fault of a rotating shaft of a component is also described herein, the method comprising connecting a first accelerometer to the rotating shaft and connecting a second, reference accelerometer to the component at a location that is not on the rotating shaft; providing a base station and transmitting first information from the first accelerometer to the base station; the first information relating to the movement of the rotating shaft; and transmitting second, reference, information from the second, reference accelerometer to the base station; the second, reference, information relating to the location that is not on the rotating shaft; and comparing the first information with the second information that has been sent to the base station, to detect the fault in the rotating shaft.

The method may further comprise connecting an electronic module to the base station. In some examples, the electronic module may be configured to perform the fault detection based on signals received from the sensors.

The method may further comprise connecting the electronic module to the base station via a high-speed multinodes bus, or other means.

The method may further comprise connecting a power drive unit to the electronics module to provide power to the electronics module.

The method may further comprise connecting the power drive unit to the electronics module via an electronic cable.

The method may further comprise connecting the electronics module to the avionics system.

The method may further comprise transmitting the first information from the first accelerometer to the base station via a wireless transceiver.

The method may further comprise connecting the wireless transceiver to the rotating shaft that is being monitored.

The method may further comprise providing a wireless transceiver at the base station.

The method may further comprise transmitting the second, reference, information from the second, reference accelerometer to the base station via a high-speed multinodes bus.

The method may further comprise providing a plurality of the first accelerometer sensors.

The method may further comprise providing the first accelerometers on a plurality of locations along the length of the rotating shaft that is being monitored.

The method may further comprise connecting the plurality of accelerometers to the same rotating shaft. In some examples, the method may additionally, or alternatively, comprise connecting the plurality of accelerometers to different rotating shafts.

In some examples, the component may comprise an aircraft wing comprising a flap/slat assembly and the method may comprise connecting the first accelerometer on a rotating shaft of the assembly, and providing, and/or connecting the second, reference accelerometer on or to the aircraft wing.

The new type of system and method for detecting a fault on a rotating shaft will now further be described in greater detail with reference to FIG. 1.

BRIEF DESCRIPTION OF THE DRAWING

FIG. 1 depicts an example of a new type of system for detecting mechanical failure of a rotating shaft within an aircraft component.

DETAILED DESCRIPTION

The system described herein is aimed at reducing the size, weight and cost of mechanical protection devices that are found in aircraft, (such as torque limiters that are usually used in flaps/slats assemblies). In order to do this, the new examples described herein propose an alternative solution to those that are known in the art. These new examples are able to detect any rapid change of mechanical behaviour like jamming condition.

Although one way in which the weight and size of mechanical protection devices may be reduced may be to remove the standard torque limiters and instead use torque sensors, unfortunately, torque sensors may not have the necessary bandwidth to detect fast transient failures such as a sudden jamming condition or mechanical link breakage.

The improved methods and devices described herein therefore improve on this by improving the way in which the torque is sensed (to detect such fast fault conditions).

The examples described herein involve sensing a jam condition or any abnormal conditions of a rotating shaft by sensing angular acceleration through an accelerometer sensor or sensors. Examples of such accelerometers include MEMS (MicroElectronics Mechanical Systems) 3-axis or 2-axis accelerometers, however, the examples are not limited to these types and any other types of accelerometer that achieve the desired effects may be used.

Although the response of torque information is limited by the wireless transceiver bandwidth, the new type of system described herein is able to provide a faster transient response than known devices and methods. This therefore puts less stress on the mechanical structure during a jam or other fault conditions. Moreover, because of the small size and cost of the accelerometer sensors used in the examples described herein, they can also be attached to different rotating mechanical parts of the systems and thus allow the detection of the position (i.e. localization) of any mechanical faults that occur.

In some examples, the detected mechanical faults may be reported to an electronic controller that supplies the power drive unit in a simple, lightweight and inexpensive fashion.

In the examples described herein, information may be transferred from the accelerometer to the electronics as follows.

An example of an improved system 500 for detecting a mechanical failure or fault in a rotating shaft 10 is shown in FIG. 1. FIG. 1 shows the rotating shaft 10, which may be used for many purposes. For example, it may be a power transmitting shaft or a gear box. Other uses are also envisaged and the means for detecting described herein are not only limited to these examples. At least one accelerometer 20 is connected to the rotating shaft 10. In some examples the accelerometer 20 may be bonded directly to the outer surface of the shaft. The accelerometer sensor 20 is therefore used to measure the dynamic torque of the rotating shaft and, as described herein, is also able to detect a jamming condition.

An electronic wireless communication means 30 is also provided. This wireless communication means 30 is also bonded to the outer surface of the rotating shaft. This is electronically connected to the accelerometer sensor 20 and is configured to receive a signal from the accelerometer 20 that represents a measurement of the rotating shaft 10 that has been made by the accelerometer.

The wireless communication means 30 is further in wireless bi-directional communication with a base station 40. The base station 40 comprises a data or power wireless transceiver base station 40 that is configured to send and receive electronic communication signals from and to the wireless communication means 30. The information provided from the accelerometer 20 to the wireless communication means 30 on the rotating shaft 10 is therefore further transmitted from the wireless communication means to the base station 40. The response of the torque information is limited by the wireless transceiver bandwidth.

In some examples, the base station is also capable of wirelessly providing power to the sensor 20 as well as information.

The base station 40 is connected via a high-speed multi-node bus 50 to an electronics module 60. The electronic module 60 is capable of communicating bi-directionally with the base station, which may send information wirelessly back to the transceiver 30. This therefore permits fault detection to be performed at the sensor level.

The electronics module 60 is in turn connected to (via any means, however, in FIG. 1, via electronic cable(s) 65) and powered by a power means. Any power means may be used, however, in the example shown in FIG. 1, the power means comprises a power drive unit 70. The electronics module 60 is, in turn, connected to the power drive unit 70 through power cable 65, to receive the adequate power level. The electronic module 60 is also connected to an avionics system 90 through a dedicated robust bus 95 such as CAN or ARINC 429.

As can also be seen in FIG. 1, the base station 40 is also connected electronically to at least one reference sensor 80. In the example shown in FIG. 1, this reference sensor 80 comprises a 3 axis accelerometer sensor. The reference acceleration allows the system 500 to take account of any roll, yaw or pitch to which the first accelerometer is subjected. In some examples wherein the system 500 is used in an aircraft, the reference accelerometer may be mounted in or on a fixed part of a component 100 such as the aircraft wing. The reference sensor information (e.g. relating to the localisation and which sensor(s) it is using for reference) is sent to the electronic module 60 or directly to the sensor 20 for compensation correction. Additional torque sensors 20, 80, both on shafts that are being monitored and additional reference sensors 80, (not shown) may also be connected to the base station via the high speed multi-node bus so that multiple rotating shafts may be measured and monitored simultaneously by the system 500 of FIG. 1.

The system further comprises means (such as electronic means, for example) that is configured to compare the first information that is sent to the base station with the second information that has been sent to the base station, so as to detect and determine a fault in the rotating shaft.

In some examples, this means for comparing and detecting/determining a fault in the rotating shaft is provided in the base station. In other examples, however, this means for detecting and determining a fault by comparison of this information may be provided in the electronics module. It is envisaged that the means could also be provided elsewhere in the system that is capable of receiving and comparing this information. The measurement of torque of the rotating shaft 10 may be achieved as follows:

For example, as is well known, torque is the variation of angular speed over time caused by a change in resistive torque. The torque of a rotating shaft 10 such as that shown in FIG. 1 therefore depends on the force, angle and length of the rotating part defined by the moment of inertia J. The mechanical equation below links these terms:

$$\{J \times \text{angular\_accelaration} = (\text{Torque} - \text{Torque\_resistive})\}.$$

As it can be seen with this equation, the resistive torque can therefore be estimated from the measurement of the angular acceleration. If the moment of inertia is known and the torque is also known because of known operating condition (either from flap extension, retraction and other profiles from motor data, such as phase currents and motor speed), it is possible to quantify the angular acceleration of the shaft.

In the system 500 shown in FIG. 1, a first accelerometer 20 is used to sense the angular acceleration at the shaft level. In order to transmit the power/signal from/to the accelerometer sensor, an induction power transfer technique is used with data transfer, for example through FSK (Frequency Shift Keying) for receiving data from the accelerometer 20. In some examples, several accelerometers could even be bonded on the shaft 10 to obtain a greater insight into the instantaneous angular acceleration. This therefore reduces the number of axes required by the accelerometer(s).

In some examples, several accelerometer sensors 20 could alternatively or additionally be placed in different locations, for example, along the drive train and branching transmissions of a system. In this way it is possible to obtain a better localization of a fault. For examples, in aircraft, the flaps and slats are made up of different rotating sections or panels, each panel being driven by at least one actuator. Having a sensor 20 connected to each section or panel/actuator would help the system 500 to localise which panel is faulty and therefore speed up the repair.

The systems 500 described herein are able to therefore sense the high dynamic torque variation by using inexpensive, robust and light MEMS. The multi-axis accelerometers also permit the reduction in size, cost and maintenance of high lift systems since the torque limiter will be able to be removed.

Moreover, when multiple accelerometers are used, the examples described herein allow for the localization of the fault so that the location of the fault can be detected and the mechanical failure dealt with more quickly.

With the systems 500 described herein it is also possible to detect a detached shaft (i.e. high linear acceleration) through a specific algorithm. For example, one way would be to analyse the derivative of the linear acceleration (jerk), and if it exceeds the nominal operation bounds it would indicate a detachment. Other methods could alternatively be used to compare the actual acceleration with standard operational profiles, among others.

Because the shaft is not used to sense any physical parameter such as torque, its bonding performance is not a key design driver, contrary to other sensors such as strain gauges.

Any degradation of the bonding will also not change the typical accuracy that is required. This is because the shaft 10 is used as a support for the sensor 20 and so any slight variation in the bonding will not induce any critical error since it is only the shaft movement that is being measured. However, if the sensor is close to detachment, oscillation will occur during measurement and this could be detected and flagged as a faulty sensor.

The methods and systems 500 described herein may be applicable to multiple mechanical systems (e.g. landing gears, braking systems, flight control surfaces, etc.).

In the examples described herein, the mechanical fault is detected is found using an algorithm that is based on external data such as cockpit data, air speed, altitude etc.

What is claims is:

1. A system for detecting a mechanical fault of a rotating shaft of a component;
said system comprising:
a first accelerometer configured to be connected to said rotating shaft of said component for obtaining first information relating to movement of the rotating shaft; and
a second, reference accelerometer configured to be connected to said component at a location that is not on said rotating shaft, for obtaining second, reference information relating to said location that is not on said rotating shaft; and
means for compensating said first information with said second information to detect said fault in said rotating shaft;
wherein said system is configured to take into account any roll, yaw, or pitch to which the first accelerometer is subjected.

2. The system of claim 1, further comprising:
a base station and/or an electronic module; and
means for transmitting said first information from said first accelerometer to said base station and/or electronics module; and means for transmitting said second, reference, information from said second, reference accelerometer to said base station and/or electronics module.

3. The system of claim 2, wherein said electronic module is connected to said base station via a high-speed multi-nodes bus.

4. The system of claim 3, further comprising:
a power drive unit connected to said electronics module to provide power to said electronics module.

5. The system of claim 4, wherein said power drive unit is connected to said electronics module via an electronic cable.

6. The system of claim 2, further comprising:
an avionics system and wherein said electronics module is connected to said avionics system.

7. The system of claim 2, wherein said means for transmitting said first information from said first accelerometer to said base station comprises a wireless transceiver.

8. The system of claim 7, wherein said wireless transceiver is configured to be connected to said rotating shaft.

9. The system of claim 8, wherein said base station comprises a wireless transceiver.

10. The system of claim 2, wherein said means for transmitting said second, reference, information from said second, reference accelerometer to said base station and/or electronics module; comprises a high-speed multi-nodes bus.

11. The system of claim 1, wherein said first accelerometer sensor and/or said second, reference accelerometer sensor comprises a 3 axis accelerometer sensor.

12. The system of claim 1, further comprising a plurality of said first accelerometer sensors.

13. The system of claim 12, wherein said plurality of accelerometers are provided in a plurality of locations along the length of the rotating shaft.

14. The system of claim 12, wherein said plurality of accelerometers are configured to be connected to the same rotating shaft, or wherein said plurality of accelerometers are configured to be connected to different rotating shafts.

15. The system of claim 1, wherein said component comprises an aircraft wing comprising a flap/slat assembly; said first accelerometer being provided on a rotating shaft of said assembly, and wherein said second, reference accelerometer is provided on said aircraft wing.

* * * * *